No. 773,048. PATENTED OCT. 25, 1904.
R. E. BRIGGS.
TROLLEY WHEEL.
APPLICATION FILED JUNE 15, 1904.
NO MODEL. 2 SHEETS—SHEET 2.
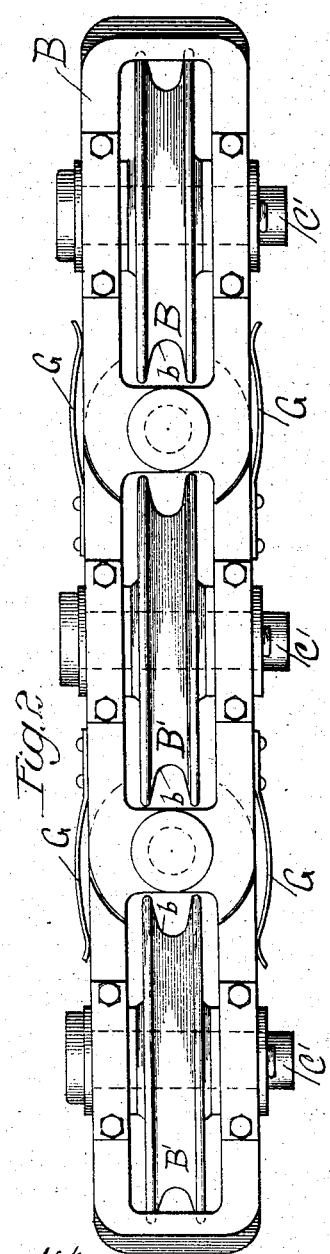
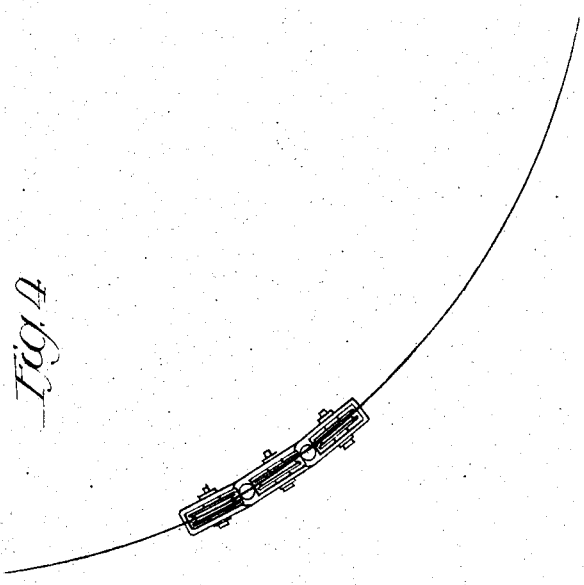
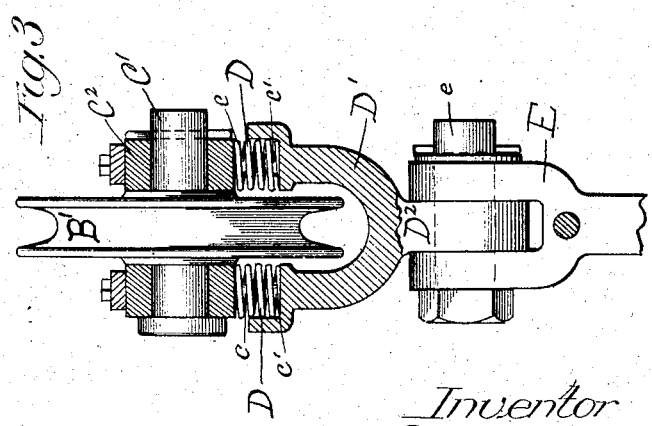
Witnesses:
Edw. P. Barritt
Charles J. Cobb
Inventor
Ray E. Briggs
by Florence King
Attys.

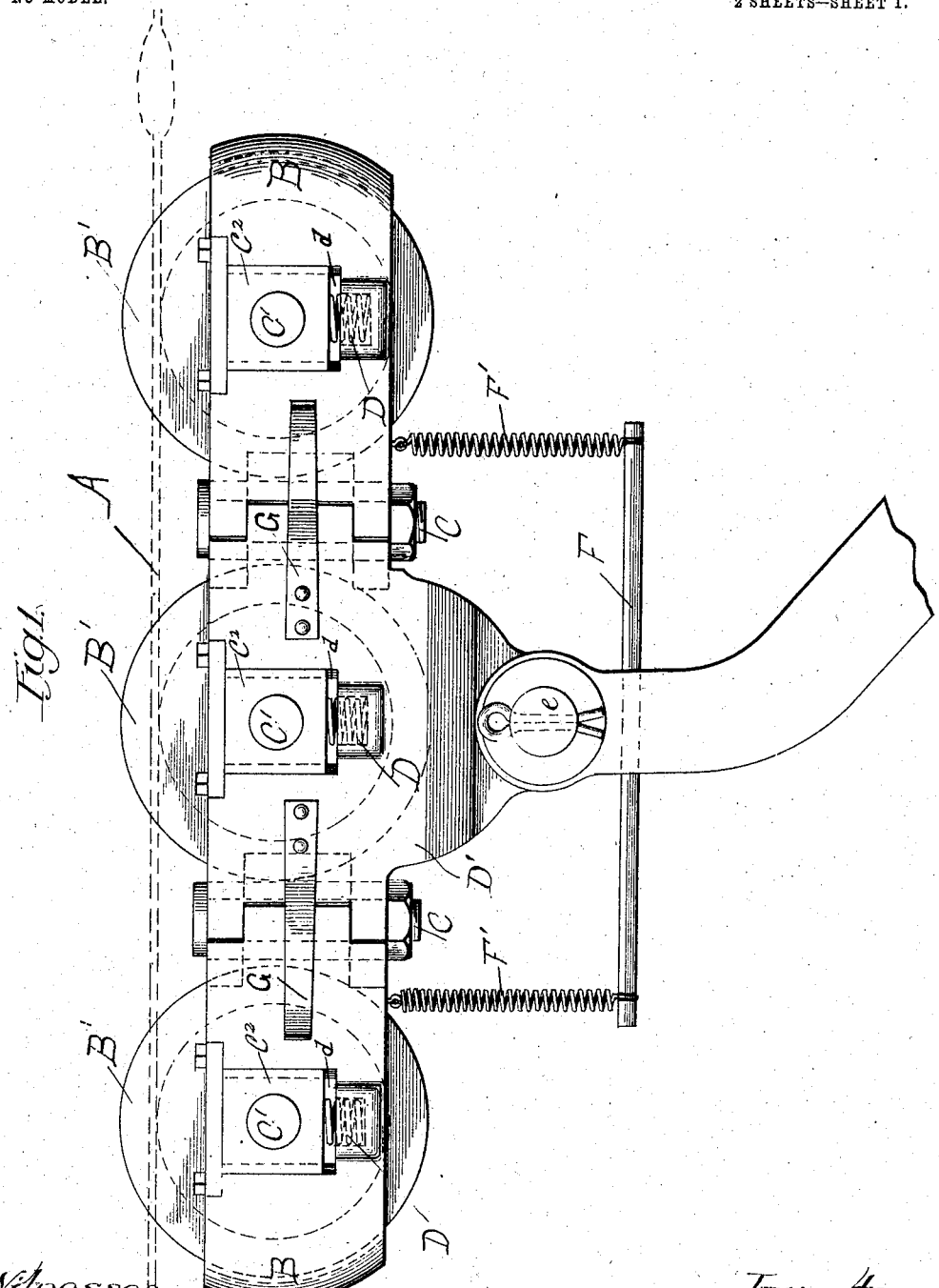

No. 773,048.

Patented October 25, 1904.

UNITED STATES PATENT OFFICE.

RAY E. BRIGGS, OF CHICAGO, ILLINOIS.

TROLLEY-WHEEL.

SPECIFICATION forming part of Letters Patent No. 773,048, dated October 25, 1904.

Application filed June 15, 1904. Serial No. 212,597. (No model.)

*To all whom it may concern:*

Be it known that I, RAY E. BRIGGS, a citizen of the United States, and a resident of Chicago, in the county of Cook and State of Illinois, have invented certain new and useful Improvements in Trolley-Wheels, of which the following, taken in connection with the drawings, is a specification.

My invention has for its object the production of a trolley-wheel, the principal object of which is to provide such an arrangement as will positively prohibit the wheel from escaping the wire, as is often the case with those now in use, especially when the car is passing around a curve or the wheel is traveling over a joint. By my invention I have overcome this difficulty by the novel construction and arrangement of parts shown in the preferred form in the accompanying drawings, in which—

Figure 1 is a side elevation of my invention. Fig. 2 is a top plan view of the same. Fig. 3 is an end view partly in section, and Fig. 4 shows the relative position of the wheels as the device is passing around a curve.

In carrying out my invention the trolley-wire is represented at A, Fig. 1. Suitably mounted in bearings in a frame B are a series of trolley-wheels B', provided with the usual groove $b$ upon the periphery thereof. The frame B is made in sections according to the number of wheels used, which is preferably three, as shown in the drawings. The sections may be secured together in any desired manner to enable the device to conform to such a curve as is formed by the wire in passing around corners, &c. In this instance I have shown the sections secured together by a bolt C passing therethrough and forming a hinge or pivotal connection.

Each of the trolley-wheels B' is mounted upon an axle C', which is journaled in a box $C^2$, seated inside of the frame B. Each of these boxes $C^2$ is provided upon its under side with a boss or projection $c$. (Shown more particularly in Fig. 3.) The frame B is provided with a corresponding boss or projection $c'$. (Also shown in Fig. 3.) These bosses $c$ and $c'$ serve to hold in place a coiled spring D under each of the boxes $C^2$ and takes up the slight vertical movement of the wheels in passing over joints, &c., in the wire. A slight space (the fraction of an inch) is left between the bottom of the box $C^2$ and the edge of the frame (shown at $d$, Fig. 1) to permit of this movement.

The center of the frame B is provided with a yoke D', which has an extension $D^2$ fitting the bifurcated end of the trolley-pole E and is pivotally secured thereto by a bolt $e$. A shaft F passes through an aperture near the bifurcated end of the trolley-pole and has secured thereto at each end thereof a spring F', which is attached at the end thereof in any desired manner to the frame B, as shown in Fig. 1. When the device is in operation and the car is traveling up or down an incline, the outside wheels are held to the wire by means of the shaft F and the tension of the springs F'. Upon each side of the frame B and extending across the joints thereof I provide springs G, which are secured at one end thereof to the inner section of the frame B. The purpose of this spring is to maintain the frame B in position conforming to corner-curves, &c., and to prevent the trolley-wheel from escaping the wire when passing around such curves, the tension thereof tending to keep the wheels in their normal position.

It will be observed that I have provided a device which is positive in its operation and one which under all circumstances will prevent the wheel from escaping the wire. The tension and pressure of the coiled and leaf springs is such at all times that the wheel is held to its proper position on the wire. When the forward wheel strikes a joint and, as is often the case, is jarred out of place, the following wheels remain in position and draw the forward wheel back to the wire.

It is obvious that various details of this construction may be changed without departing from the spirit of my invention, such as the size and proportion of the parts, the location of the different springs, the number and size of the wheels employed, and other equivalent changes which I contemplate in my construction.

I claim—

1. In a device of the class described, the combination of a plurality of trolley-wheels mounted in a sectional frame, side springs adapted to maintain said frame in longitudinal position, and vertical springs beneath the frame adapted to hold the wheels against the wire, substantially as described.

2. In a device of the class described, the combination with a trolley-pole, a yoke secured to the bifurcated end thereof, said yoke supporting a sectional frame, spring-supported journal-boxes in said frame, and a main trolley-wheel and two auxiliary wheels mounted in said journal-boxes, substantially as described.

3. A frame for trolley-wheels comprised of sections pivotally secured together, each of said sections having mounted therein a journal-box, springs disposed thereunder to allow a slight vertical movement of the box, substantially as described.

4. In a device of the class described, the combination of a plurality of trolley-wheels journaled in spring-supported boxes, a sectional frame in which said journal-boxes are mounted, and springs upon the sides of said frame adapted to maintain said frame in position when the wheels are passing around a curve, substantially as described.

5. In a device of the class described, the combination of a plurality of trolley-wheels, a sectional frame in which said wheels are mounted, said frame pivotally secured to the trolley-pole, a shaft passing through the trolley-pole near the pivotal point, and springs connecting the shaft to the frame, substantially as described.

6. In a device of the class described, the combination of a plurality of trolley-wheels, a sectional frame having spring-supported journal-boxes, said trolley-wheels mounted upon axles supported in said boxes, springs upon the sides of said frame adapted to maintain the same in longitudinal position, a rod or shaft passing through the bifurcated end of the trolley-pole, and springs connecting each end of said rod to the frame, substantially as described.

7. In a device of the class described, a trolley-pole supporting at the bifurcated end thereof a yoke, a sectional frame secured to said yoke, a shaft passing through the trolley-pole each end of which is connected to said sectional frame, spring-supported journal-boxes carried by said sectional frame, a main trolley-wheel and two auxiliary wheels mounted in said journal-boxes, and means for maintaining said wheels in a common plane, substantially as described.

In witness whereof I have hereunto signed this specification in the presence of two witnesses.

RAY E. BRIGGS.

Witnesses:
FLORENCE KING,
CHARLES I. COBB.